Figure 1:
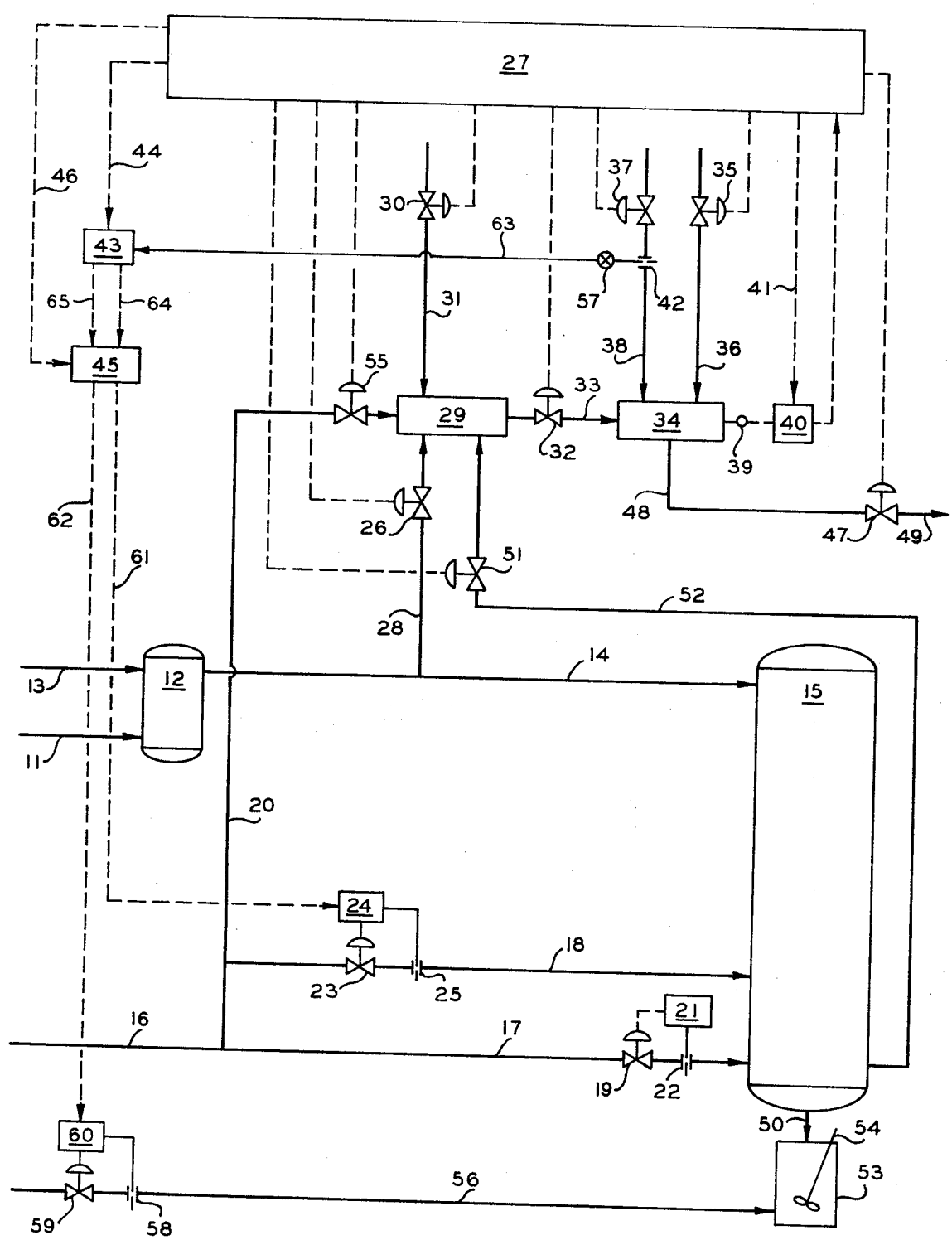

United States Patent [19]
Uraneck et al.

[11] 3,755,273

[45] Aug. 28, 1973

[54] AMPEROMETRIC ANALYSIS METHOD AND APPARATUS FOR CONTROL OF CATALYTIC REACTIONS

[75] Inventors: Carl A. Uraneck; Richard L. Smith, both of Bartlesville, Okla.

[73] Assignee: Phillips Petroleum Company, Bartlesville, Okla.

[22] Filed: Apr. 6, 1971

[21] Appl. No.: 131,649

[52] U.S. Cl.............. 260/83.7, 260/85.1, 260/85.3, 260/94.2 M, 260/94.7 S, 260/94.9 P
[51] Int. Cl....... C08d 3/08, C08d 5/02, C08f 27/06
[58] Field of Search.................. 260/94.2 M, 94.7 S, 260/94.9 P, 85.3, 85.1, 83.7

[56] References Cited
UNITED STATES PATENTS 3,276,843   10/1966   Cooper........................ 260/94.2 X
3,290,116   12/1966   Carroll........................ 260/94.2 X

*Primary Examiner*—Joseph L. Schofer
*Assistant Examiner*—William F. Hamrock
*Attorney*—Young & Quigg

[57] ABSTRACT

A process is provided for the automatic determination of reactive metal sites in a reaction product and for the automatic introduction of the stoichiometric quantity of coupling or terminating agent required to react with the metal sites in response to the said determination. The process, in another aspect, determines the quantity of catalyst poisons in a feed stream and, in response thereto, introduces the quantity of catalyst required to react with the feed poisons.

7 Claims, 3 Drawing Figures

INVENTORS
C. A. URANECK
R. L. SMITH
BY
Young and Quigg
ATTORNEYS

AMPEROMETRIC ANALYSIS METHOD AND APPARATUS FOR CONTROL OF CATALYTIC REACTIONS

This invention relates to a method and apparatus for controlling the addition of catalyst into a reaction system. The invention further relates to a method and apparatus for maintaining a desired concentration of active catalyst in a reaction zone regardless of variations in the concentration of catalyst poisons contained in feed streams thereto. The invention still further relates to the utilization of an automatic titration system to intermittently and repetitively determine the concentration of catalyst poisons in reaction feed streams and to control the addition of catalyst to the reaction responsive to such determination.

The invention also relates to the utilization of an automatic titration system to determine the concentration of active catalyst sites in a reaction product in order to facilitate the determination of (a) the optimum quantity of terminating agent required to destroy the active catalyst sites to thereby terminate the reaction, or (b) the optimum quantity of coupling or reactive agent required to join polymer molecules or convert polymer ends into desired end groups.

Variations in the concentration of catalyst poisons in one or several feed streams to a reaction zone lead to difficulties in process control and in the maintenance of the desired properties of the reaction products. For example, in the solution polymerization of butadiene to form cis-polybutadiene, variations in the level of catalyst poisons in the feed streams affect the rate of the polymerization reaction and the Mooney viscosity of the polymer product.

The total quantity of catalyst required to produce a reaction product having certain desired properties at a desired rate of reaction can be defined as the sum of a "constant increment" and a "variable increment." The "constant increment" is the quantity of catalyst required to produce the desired properties of the final product at the desired rate of reaction in the absence of catalyst poisons. The value of the "constant increment" required for different values of the desired property of the product can be determined by laboratory tests utilizing feed materials substantially free of catalyst poisons. Thus, the desired value of the "constant increment" can be readily determined and the corresponding amount of catalyst can be readily introduced into the reaction zone.

In commercial processes reaction rates and physical properties of the product change as the level of catalyst poisons in the feed materials changes, thus the "variable increment" is the quantity of catalyst required to destroy or neutralize the catalyst poisons, principally oxygen and water, contained in the feed stream. However, determining the "variable increment" by examining the properties of the product and exercising process control therefrom is not suitable for control purposes, because of variations in the level of catalyst poisons during the time required for a given catalyst poison level to be determined from the properties of the product sample analyzed.

There is, accordingly, presented the problem of determining and adding the quantity of the "variable increment" required to neutralize the poison actually contained in the feed in or being introduced into the reaction zone.

In reactions such as in certain organometal-initiated polymerization reactions, which are terminated by the addition of a chemical designed to remove reactive metal sites on the polymer by joining polymer at the reactive sites, it is highly desirable to know with certainty the concentration of reactive sites in order that the chemical can be added in stoichiometric amount. Such chemicals are known in the art as "coupling" agents, where it is their function to link together or couple polymer units at the reactive sites and to thereby terminate the polymerization reaction. In order to obtain the maximum desired molecular weight of the coupled polymer it is necessary that the "coupling" agent be added in precise stoichiometric amount. Either too little or too much "coupling" agent will result in the production of polymer having an undesirable molecular weight. (See U.S. Pat. No. 3,281,383 to Zelinski and Hsieh, and particularly U.S. Pat. No. 3,468,972 to Hsieh for further discussion of this point.)

Heretofore, the quantity of coupling agent added to the polymer at the end of the reaction period has been based upon the calculated theoretical quantity of reactive metal sites, such as, for example, the number of carbon-lithium bonds or polymer-lithium, in the polymer product. However, the theoretical quantity of polymer-lithium present can be affected by unknown or unanticipated poisons in the reaction vessel which could reduce the quantity of polymer-lithium below the theoretical quantity. Such poisons include water and air which could leak into the reactor, and slow acting poisons such as 1,2-butadiene contained in feed streams. Side reactions, usually occurring at high temperatures, involving polymer-lithium to produce lithium hydride also reduce the quantity of polymer-lithium.

There is, accordingly, presented the additional problem of not only determining the quantity of catalyst poison in the feed stream to the reactor, but also, in certain reactions, of accurately determining, later in the polymerization, the number of reactive sites to be reacted with coupling agent wherein both problems are directly concerned with molecular weight control of the product.

It is therefore an object of this invention to provide an improved system for maintaining the properties of a catalytic reaction product at desired values. Another object of this invention is to provide an accurate method and means for determining the level of poisons in the feed materials to a reaction and for controlling the addition of catalyst or initiator to the reaction responsive to such determination. Still another object of this invention is to provide an accurate method and means for determining the level of reactive metal sites in a polymerization product and for controlling the addition of a suitable agent to remove the sites.

In accordance with this invention, there is provided method and apparatus for controlling any reaction which involves the use and/or the production of any active organometal compound which is capable of rapidly cleaving hydrocarbyl disulfides. (See Analytical Chemistry 40 (Feb. 1968) p. 327, for a discussion of the chemistry involved herein which per se forms no part of this invention.)

Thus, in one aspect of the invention, there is provided apparatus and method for the automatic introduction into a primary reaction zone of the amount of organometal catalyst or initiator necessary to obtain desired properties of the product and/or the desired reaction rate which comprises passing a known quantity of at least one feed stream into said primary reaction zone, withdrawing a measured quantity of sample from said feed stream, passing the thus-withdrawn sample into a secondary reaction zone, and combining with said sample in said secondary reaction zone a known quantity of said organometal compound of substantially known concentration wherein the quantity of said organometal compound introduced is at least in slight excess of the amount which will be consumed by all the poisons in the sample. A hydrocarbyl disulfide is then introduced into the secondary reaction zone in at least slight stoichiometric excess of the organometal compound previously introduced into the secondary reaction zone. All the residual organometal compound not consumed by the catalyst poisons then reacts with and cleaves a portion of the disulfide in the secondary reaction zone to thus form a metal containing reaction product. The contents of the secondary reaction zone or a known portion thereof, are then introduced into a titration zone wherein a measured quantity of a titrant, such as silver nitrate, which reacts with the said metal containing reaction product, is slowly introduced with mixing until a sharp rise in electrical current flow which signifies titration end point is detected by an electrode system. The equivalents of titrant required to titrate the said metal containing reaction product of the organometal compound and the disulfide is equal to the equivalents of the organometal which was not consumed by poisons present in the feed sample. From the above information, the quantity of organometal compound required to consume the poisons in the feed stream to the primary reaction zone, and therefore the previously-mentioned variable increment, is determined and the automatic control of the addition of the variable increment into the reaction system is then initiated.

In another aspect of the invention, a known quantity of sample of the reaction product mixture from the primary reaction zone containing one or several active organometal compounds, for example polymer-lithium, as well as hydrocarbyl lithium, is introduced into the above-mentioned secondary reaction zone (in lieu of the feed sample plus the organometal), the disulfide is then added, and the same titration procedure as described above is then followed. However, in this aspect, the equivalents of titrant added prior to the sharp rise in electrical current flow is equal to the equivalents of active organo-metal compounds, for example, polymer-lithium plus hydrocarbyl lithium, present in the reaction product sample. From the above information, the concentration of active catalyst (and/or initiator) may be determined and its concentration adjusted as desired, or if the reaction is to be terminated, the stoichiometric quantity of coupling agent required to react with the metal-containing polymer may be determined and automatic control of its addition may then be initiated.

Other objects, aspects, and the several advantages of the invention will be apparent to one skilled in the art from a study of the disclosure, the drawings and the appended claims.

Referring now to FIG. 1, there is shown a schematic representation of a polymerization process incorporating this invention. As previously mentioned, the invention is applicable to any reaction involving any active organometal compound capable of cleaving certain disulfides, however, for purpose of illustration, the invention will be described in terms of the organolithium catalyzed production of polybutadiene. Accordingly, a feed stream comprising 1,3-butadiene is passed through conduit 11 into mixing means 12 wherein it is contacted with a suitable solvent, for example, hexane, which is passed through conduit 13 into mixing means 12. Mixing means 12 can be of any suitable design known to those skilled in the art, for example, a multi-orifice mixer. The resulting mixture of feed and solvent is withdrawn from mixing means 12 and passed through conduit 14 into primary reactor 15. Reactor 15 can be any suitable polymerization reactor known in the art and can comprise a single reactor or a plurality of reactors either in series or in parallel or both. Batch or continuous polymerization or copolymerization operations can be conducted in reactor 15, however, the presently preferred embodiment is batch operation.

A suitable initiator or catalyst, for example n-butyllithium, is passed through conduit 16 and branch conduits 17 and 18 into reactor 15. The batch or continuous flow of catalyst through branch conduit 17 is regulated by valve 19 which is manipulated by flow recorder controller 21 responsive to a comparison of a set point value and the measured flow through conduit 17 as determined by flow element 22. The set point signal to controller 21 is representative of the "constant increment" value which has been predetermined. Thus the flow of catalyst through branch conduit 17 is the amount required to obtain the desired reaction rate and/or product properties, assuming the presence of no catalyst poisons in the feed streams to reactor 15. The batch or continuous flow of catalyst through branch conduit 18 is regulated by valve 23, which is manipulated by flow recorder controller 24 responsive to a comparison of a set point value and the measured flow through conduit 18 as determined by flow element 25. While the flow sensors have been shown in terms or orifices 22 and 25, any suitable flow detector-transmitter can be utilized. The set point signal to controller 24 is representative of the "variable increment" which is determined in a manner hereinafter described. Thus the flow of catalyst through branch conduit 18 is the amount required to neutralize the catalyst poisons contained in the feed streams to reactor 15.

Valve 26 is actuated by programmer-controller 27 to intermittently and repetitively withdraw a measured sample of the blended feed materials from conduit 14 and pass the thus withdrawn sample through conduit 28 into secondary reaction vessel 29. Valve 26 is preferably a valve which is adapted to pass a sample of predetermined volume into vessel 29. However, it is within the contemplation of the invention to utilize any suitable means for passing a predetermined volume or otherwise measured amount of sample into vessel 29. After the introduction of the sample into vessel 29, valve 55 is actuated by programmer-controller 27 to pass a measured amount of an organometal compound of known concentration from a source thereof, such as conduit 16, through conduit 20 into secondary reaction vessel 29 wherein the organometal compound, which in this embodiment is the catalyst, reacts with the catalyst poisons contained in the sample of blended feed materials. The amount of organometal compound introduced into vessel 29 via valve 55 must be in at least slight excess of the amount required to react with all of the catalyst poisons contained in the sample of blended feed materials. Best results are obtained if the total amount of organometal introduced into vessel 29 is in the range of 1.25 to 5 times the amount of organometal consumed.

Suitable organometal compounds include organolithium compounds such as those included in the general formula $R(Li)_x$, where R is a hydrocarbon radical selected from the group consisting of aliphatic, cycloaliphatic, and aromatic radicals and $x$ is an integer from 1 to 4, inclusive. The aliphatic and cycloaliphatic radicals can be saturated or contain olefinic unsaturation. The R in the formula has a valence equal to the integer $x$ and can contain from one to 20, inclusive, carbon atoms. It is also within the scope of the invention to use higher molecular weight organometal compounds, such as polymers, which have active terminal lithium atoms which are referred to herein as polymer-lithium.

Examples of the $R(Li)_x$ compounds include methyllithium, isopropyllithium, n-butyllithium, tert-octyllithium, n-decyllithium, phenyllithium, 1-naphthyllithium, 4-butylphenyllithium, p-tolyllithium, 4-phenyl-1-butyllithium, cyclohexyllithium, 4-butylcyclohexyllithium, 4-cyclohexyl-1-butyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-phenylcyclohexane and the like.

It is preferred that the organometal compound introduced via valve 55 be the same as the catalyst which is being employed in reactor 15 as this eliminates any requirement of converting the amount of organometal required to react with the catalyst poison in the sample to the equivalent amount of the reaction catalyst. However, it is not required that the organometal compound utilized in vessel 29 and the catalyst used in reactor 15 be the same.

After a suitable period of time, i.e., 1/2 minute, to allow for complete reaction between all the catalyst poisons and the organometal in vessel 29, valve 30 is actuated by programmer-controller 27 to pass a suitable disulfide compound from a source, not shown, through conduit 31 into reaction vessel 29 wherein the disulfide reacts with all of the residual organometal compound which was not consumed by the catalyst poisons to thus form a mercaptide. It is required to pass sufficient disulfide into vessel 29 to consume all of the residual organometal, however, it is preferred that the amount of disulfide introduced be in approximately 50 per cent stoichiometric excess of the total amount of organometal compound which is introduced into vessel 29.

Suitable disulfides are those which are capable of being rapidly cleaved by the organometal compound and include hydrocarbyl disulfides having the general formula R'SSR" wherein R' and R" are hydrocarbon radicals selected from the group consisting of alkyl, aryl, cycloalkyl, alkylcycloalkyl, alkaryl, aralkyl, arylcycloalkyl, cycloalkylaryl and the like. Cyclic alkylene disulfides and cyclic arylene disulfides can also be employed. The cyclic disulfides can be represented by the general formula $$(R''')$$
$$(S—S)$$

wherein R''' is the alkylene or arylene radical containing from four to 16 carbon atoms. The total number of carbon atoms in the hydrocarbyl disulfides is generally in the range of from 4 to 16 per molecule. R' and R" preferably contain from two to 14 carbon atoms. Examples of these compounds include cyclohexyl disulfide; n-octyl disulfide; p-tolyl disulfide, phenyl ethyl disulfide; benzyl disulfide; 1,8-napthalene disulfide; 1,10-decylene disulfide and the like. Where the organometal compound used is n-butyllithium, as in this embodiment, the preferred disulfide is p-tolyl disulfide.

After a suitable period of time, i.e., 1 minute, to allow for complete reaction between the disulfide and residual organometal compound, valve 32 is actuated by programmer-controller 27 to withdraw the entire contents from secondary reaction vessel 29 and pass the thus-withdrawn contents through conduit 33 into amperometric titration vessel 34. An amperometric titrator useful herein can be one as described by Kolthoff and Harris, Ind. Eng. Chem., Anal. Ed., 18, 161 (1946). Alternatively, a coulometric titration apparatus such as that described by F. A. Leisey, Analytical Chemistry 26, 1607 (1954), can be used to generate silver ions and to detect the titration endpoint.

After the introduction of the contents of vessel 29 into vessel 34, valve 35 is actuated by programmer-controller 27 to pass a suitable supporting electrolyte and a titration diluent for the hereinafter-described titration from a source thereof, not shown, through conduit 36 into titration vessel 34. The preferred supporting electrolyte is a solution of ammonium nitrate in concentrated ammonium hydroxide solution which is prepared by dissolving 60 grams of ammonium nitrate per 200 ml. of 28 percent ammonium hydroxide solution. The titration diluent is a mixture of alcohol and toluene or alcohol and cyclohexane in which the alcohol is present in the range of 25 to 100 percent by volume of the total-volume of the mixture. The alcohol used is preferably methanol or isopropyl alcohol and the preferred mixture contains methanol and toluene. The electrolyte and titration diluent introduced through valve 35 can be stored together as a solution in a single vessel, not shown, in which the volume ratio of electrolyte to titration diluent is approximately 1 to 200 (1 volume electrolyte solution per 200 volumes of titration diluent).

Approximately 200 volumes of the electrolyte solution-titration diluent combination is sufficient to provide sufficient electrolyte support for efficient titration of 2 to 200 volumes of the mercaptide-containing material produced in secondary reaction vessel 29. Accordingly, a single charge of 200 volumes of the electrolyte-diluent combination can provide support for any number of separate titration analyses until a maximum of 200 volumes of material has passed from vessel 29 into vessel 34. That is, vessel 34 does not have to be emptied after each titration of material introduced from vessel 29 is completed.

After the introduction of the electrolyte and titration diluent into vessel 34, valve 37 is actuated by programmer-controller 27 to pass titrating material from a source thereof, not shown, through conduit 38 into titration vessel 34 with mixing (not shown). The titrating material is a silver nitrate solution which reacts with the mercaptide which is formed by the reaction of the disulfide and the organometal in vessel 29.

The silver nitrate titrating solution is preferably made by diluting 0.1 N aqueous silver nitrate with methanol or isopropanol to a concentration in the range of 0.02 N to 0.0005 N.

The silver nitrate titrating solution is passed through conduit 38 into vessel 34 wherein it reacts with the mercaptide introduced into vessel 34 from vessel 29. The silver nitrate is introduced into vessel 34 until all the mercaptide present in vessel 34 is consumed by the silver nitrate. A signal representative of the silver nitrate flow is produced by transmitter 57 in conjunction with flow element 42, located in conduit 38, and transmitted via line 63 to an input of computer 43. This silver nitrate flow measurement is integrated, i.e., totalized, in terms of the total volume of silver nitrate solution which was required to titrate the cleavage reaction product, i.e., lithium mercaptide, in vessel 34.

The titration end point, which occurs when the mercaptide in vessel 34 is completely consumed by the silver nitrate, is evidenced by a sharp rise in electrical current flow between a reference electrode and an indicating electrode located in vessel 34. A current indicating device 39, for example, a galvanometer or microammeter, is connected in current measuring relationship with the electrodes in amperometric titrator 34. An electrical potential existing across current indicating device 39 as a result of the current flow is applied to the input terminals of an electronic differentiator 40 which produces an output signal representative of $dI/dt$, that is, the instantaneous rate of change of current with respect to time.

The sharp rise in electrical current flow, indicative of the titration end point, is represented by a sharp increase in the derivative of current with respect to time, $dI/dt$, the output signal of differentiator 40. The output of differentiator 40 is applied to an input of programmer-controller 27.

A control signal can be transmitted from programmer-controller 27 along line 41 to deactuate differentiator 40 during the times of draining the sample from vessel 34 and/or introducing a subsequent sample into vessel 34 from vessel 29, thereby eliminating the possibility of an erroneous output signal being produced during such interval.

The sharp increase in the output of differentiator 40, corresponding to the titration end point, is utilized by programmer-controller 27 as the initiating signal to actuate valve 37 to a closed position, to transmit a switching signal along line 46 to hold circuit 45, and to signal computer 43 via line 44 to commence calculation. The computed quantity, in this aspect the "variable increment", is transmitted via line 64 to and held in hold circuit 45. On a signal from programmer-controller 27 which is transmitted via line 46 the computed "variable increment" is transmitted from hold circuit 45 via line 61 as a set point value to flow recorder controller 24. As previously mentioned, flow recorder controller 24 then operates to admit that amount of catalyst into reactor 15 to neutralize the catalyst poisons contained in the feed stream thus analyzed.

Prior to the time that computer 43 calculates and hold circuit 45 transmits the "variable increment", both are reset by appropriate signal from programmer-controller 27.

Programmer-controller 27 also actuates valve 47 in drain conduit 48 to permit the titrated samples from vessel 34 to flow through conduit 49 to a point of disposal, recovery, or treatment as desired.

The actual computations performed by computer 43 in connection with the aspect above described are described hereinafter in connection with the description of FIG. 2.

Following the polymerization reaction, the reaction mixture comprising polymer, initiator, and solvent can be withdrawn from reactor 15 by way of conduit 50 and passed to a polymer recovery zone. At least a portion of the recovery zone may involve the addition of a chemical to the reaction mixture which causes either coupling or branching termination of the polymer chains at reactive sites. The reactive sites are ordinarily points on the polymer chains involving a carbon-metal bond, in this embodiment a carbon-lithium bond and herein referred to as polymer-lithium. As previously discussed, it is very important to add the precise stoichiometric amount of "coupling" agent to the reaction product in order to achieve the desired molecular weight product. Of course, the stoichiometric amount of coupling agent required depends upon the amount of polymer-lithium in the reaction mixture. Accordingly, in another aspect of this invention, the polymer-lithium can be determined by analyzing a sample of the reaction mixture just prior to the time it passes from reactor 15 by way of conduit 50.

Referring again to FIG. 1, valve 51 is actuated by programmer-controller 27 to withdraw a measured sample of the reaction mixture from reactor 15 and pass the thus withdrawn sample through conduit 52 into secondary reaction vessel 29. Valve 51 is preferably a valve which is adapted to pass a sample of predetermined volume into vessel 29. However, it is within the contemplation of the invention to utilize any suitable means for passing a predetermined volume or otherwise measured amount of sample into vessel 29. After the introduction of the reaction mixture sample into vessel 29, valve 30 is actuated by programmer-controller 27 to pass a suitable disulfide material from a source, not shown, through conduit 31 into reaction vessel 29 wherein the disulfide reacts with all of the polymer-lithiun in the sample. It is required to pass a sufficient quantity of disulfide into vessel 29 to consume all of the polymer-lithium, however, it is preferred that the amount of disulfide introduced be in approximately 50 percent stoichiometric excess of the polymer-lithium introduced into vessel 29.

The ensuing steps for the analysis of the reaction mixture are the same and the calculations are similar to those involved in the analysis of the feed stream, except that the output of computer 43 and hold circuit 45 is representative of the stoichiometric amount of terminating or coupling agent required to be added to the reaction mixture at some point downstream of reactor 15, such as to vessel 53 which is equipped with mixing means 54. Thus, upon completion of the batch polymerization reaction, a measured sample of reaction mixture is analyzed, as previously described, and a known quantity of the remaining reaction mixture, preferably the total contents of reactor 15, is passed to vessel 53 via line 50. In this aspect, the preferred electrolyte and diluent for titrating reaction mixtures containing polymers is tetra-butyl-ammonium perchlorate and ammonium hydroxide in tetrahydrofuran.

The output of computer 43 is transmitted via line 65 to and held in hold circuit 45 and, in this second aspect, is representative of the stoichio-metric amount of coupling or terminating agent required to react with the polymer-lithium now held in vessel 53. On a signal from programmer-controller 27 which is transmitted via line 46 the computed stoichiometric amount of agent is transmitted from hold circuit 45 via line 62 as a set point value to flow recorder controller 60. Flow recorder controller 60 then operates to admit the coupling or terminating agent from a source, not shown, into vessel 53 via conduit 56. The flow of agent through conduit 56 is regulated by valve 59 which is manipulated by flow recorder controller 60 responsive to a comparison of the above-mentioned set point value and the measured flow through conduit 56 determined by flow element 58.

The actual computations performed by computer 43 in connection with the aspect above described are described hereinafter in connection with the description of FIG. 3. Regarding the analysis of the feed sample and the determination of the "variable increment," computer 43 solves the following equation upon command of programmer-controller 27 transmitted to computer 43 via line 44:

$$V_{cpr} = V_f(C_c \cdot V_{csr} - C_t \cdot V_t)/V_s \cdot C_c$$

(1)

wherein $V_{cpr}$ = Volume of catalyst solution to be introduced into primary reaction zone 15 via conduit 18, i.e., "variable increment," liters.

$V_f$ = Volume of feed being introduced into primary reaction zone 15 via conduit 14, liters $V_s$ = Volume of feed sample introduced into secondary reaction zone 29 via conduit 28, liters $V_{csr}$ = Volume of catalyst solution introduced into secondary reaction zone 29 via conduit 20, liters $V_t$ = Volume of titrating solution introduced into titration zone 34 via conduit 38, liters $C_c$ = Concentration of organometal in catalyst solution, equivalents/liter $C_t$ = Concentration of titrant in titrating solution, equivalents/liter. It is noted that the only data imput to computer 43 is $V_t$, all other data having been previously supplied in accordance with the known volumes and concentrations of $V_f$, $V_s$, $V_{csr}$, $C_c$, and $C_t$.

Figure 2:
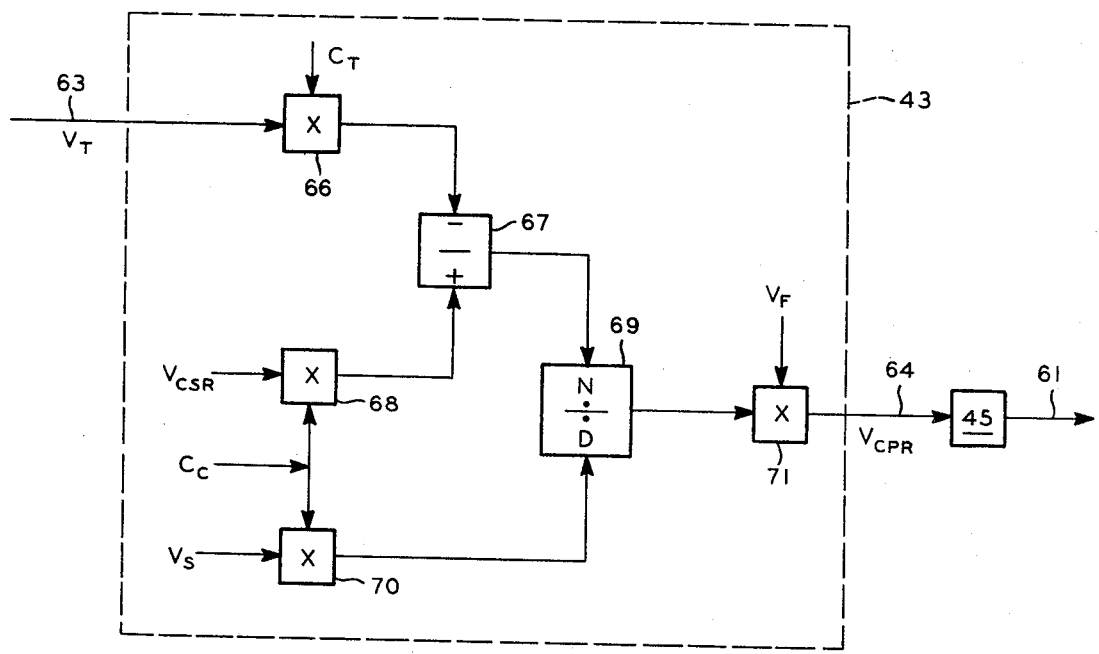

Referring to FIG. 2 there is illustrated a schematic representation of the operation of computer 43 in solving equation (1) as follows: $V_t$ is introduced via line 63 into multiplier 66 wherein it is multiplied by $C_t$ to produce a first product which is introduced as the subtrahend of subtracter 67. $V_{csr}$ is multiplied by $C_c$ in multiplier 68 to produce a second product which is introduced as the minuend of subtracter 67 wherein the first product is subtracted from the second product to produce a difference which is introduced as the numerator of divider 69. $V_s$ is multiplied by $C_c$ in multiplier 70 to produce a third product which is introduced as the denominator of divider 69 wherein the difference between the second product and the first product are divided by the third product to produce a first quotient. The first quotient is then introduced into multiplier 71 wherein it is multiplied by $V_f$ to produce $V_{cpr}$ as the fourth product which is introduced into hold circuit 45 via line 64.

Regarding the analysis of the reaction product sample and the calculation of the required volume of treating agent solution, computer 43 solves the following equation upon command of programmer-controller 27 transmitted to computer 43 via line 44:

$$V_a = C_t \cdot V_t \cdot V_{rp}/C_a \cdot V_s$$

(2)

wherein $V_a$ = Volume of treating agent solution, such as a terminating agent or a coupling agent, to be introduced into vessel 53 via conduit 56, liters $V_{rp}$ = Volume of reaction product introduced into vessel 53 via conduit 50, liters $V_s$ = Volume of reaction product sample introduced into secondary reaction zone 29 via conduit 52, liters $V_t$ = Volume of titrating solution introduced into titration zone 34 via conduit 38, liters $C_a$ = Concentration of treating agent solution, equivalents/liter $C_t$ = Concentration of titrant in titrating solution, equivalents/liter. It is noted that the only data input to computer 43 is $V_t$, all other data having been previously supplied in accordance with the known volumes and concentrations of $V_{rp}$, $V_s$, $C_a$, and $C_t$.

Figure 3:
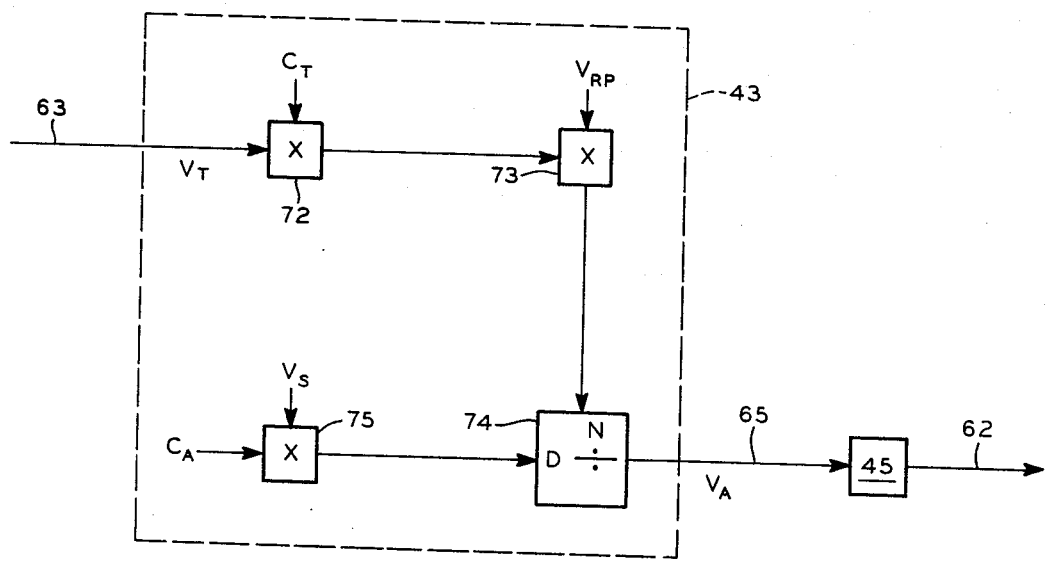

Referring to FIG. 3 there is illustrated a schematic representation of the operation of computer 43 in solving equation (2) as follows: $V_t$ is introduced via line 63 into multiplier 72 wherein it is multiplied by $C_t$ to produce a fifth product which is introduced into multiplier 73. The fifth product is multiplied by $V_{rp}$ in multiplier 73 to produce a sixth product which is introduced as the numerator of divider 74. $V_s$ is multiplied by $C_a$ in multiplier 76 to produce a seventh product which is introduced as the denominator of divider 74 wherein the sixth product is divided by the seventh product to produce $V_a$ as the second quotient which is introduced into hold circuit 45 via line 65.

While the catalyst introduction system has been described in terms of branch conduits 17 and 18, valves 19 and 23, and controllers 21 and 24, it is within the contemplation of the invention to utilize a single conduit and associated valve and controller with the set point to the controller being representative of the summation of the "constant increment" set point value of controller 21 and the "variable increment" set point value of controller 24.

While the invention has been described in terms of the lithium-initiated solution polymerization of butadiene, the invention is broadly applicable to the polymerization of conjugated diolefins containing four to 12 carbon atoms per molecule, preferably 4–8 carbons per molecule, and especially conjugated dienes such as 1,3-butadiene, isoprene, 2,3-dimethylbutadiene, 2-methoxy-1,3-hexadiene, 1,3-octadiene, and the like. These conjugated dienes can be polymerized either alone or in admixture with each other and/or with one or more compounds containing an active vinylidene group,

which are copolymerizable with the conjugated dienes. Such comonomers representatively include vinyl-substituted aromatic compounds, such as styrene, 3- methylstyrene, 1-vinylnaphthalene, and the like; vinyl halides such as vinyl chloride, vinyl bromide, vinylidene chloride, and the like; esters of acrylic acid and esters of homologues of acrylic acid, such as methyl acrylate, ethyl acrylate, methyl methacrylate, ethyl ethacrylate, methyl propacrylate, n-butyl acrylate, phenyl methacrylate, and the like; precursors of such unsaturated aliphatic carboxylic acids including nitriles and amides, such as acrylonitrile, methacrylonitrile, methacrylamide, and the like; ethers such as methyl vinyl ether; ketones such as methyl isopropenyl ketone, methyl vinyl ketone, and the like.

Catalysts (or polymerization reaction initiators) which can be used in the polymerization of the conjugated diolefins described herein are well known to those skilled in the art. The use of organolithium compounds as catalysts has been previously mentioned. Other catalyst systems which can be used in polymerizing the above-named conjugated dienes include those which contain as an essential ingredient a compound selected from the group consisting of metals, organometals and metal hydrides, the metal being of Groups IA, IIA, or IIIA of the periodic table. For example, hydrides or organo compounds of aluminum, gallium, indium, thallium, magnesium, calcium and beryllium can be used, alone or together with a di-, tri-, or tetra-halide of a Group IV metal such as titanium, zirconium, thorium, silicon, tin, lead, hafnium, germanium or cerium. Mixtures of titanium tetraiodide (or titanium tetrachloride) and triethylaluminum, a mixture of titanium tetrachloride (or tetraiodide) and tripropylaluminum, a mixture of titanium tetrachloride (or tetraiodide) and triisobutylaluminum, and a mixture of zirconium tetrachloride (or tetraiodide) and triethylaluminum, can be used. A third component can be added to these mixtures if desired, such as iodine or ethylaluminum dichloride or diethylaluminum chloride. Specific examples include triethylaluminum, titanium tetrachloride and titanium tetraiodide; tributylaluminum, titanium tetrachloride, and iodine; titanium trichloride and diethylaluminum chloride.

While hexane has been utilized as the solvent in the description of the drawing it is within the contemplation of the invention to utilize any suitable solvent. Particularly useful solvents or diluents are those of the group consisting of aromatic, paraffinic, and cycloparaffinic hydrocarbons. The preferred hydrocarbons of these types are those containing from four to 12 inclusive, carbon atoms. Examples of suitable hydrocarbons which can be used include isobutane, n-pentane, isooctane, n-dodecane, cyclopentane, cyclohexane, ethylcyclopentane, dimethylcyclopentane, methylcyclohexane, benzene, toluene, xylene, ethylbenzene, naphthalene, and the like. Mixtures of these various materials can also be employed.

As previously mentioned the invention is not limited to polymerization processes, but is generally applicable to any reaction which involves the use and/or the production of any active organometal compound which is capable of rapidly cleaving hydrocarbyl disulfides. Thus the invention is broadly applicable to processes such as alkylation, hydrogenation, and polymerization. Accordingly, it is readily obvious that the particular catalyst utilized will vary with the process and other design factors. Similarly the use of a solvent and the nature of the solvent will depend upon the particular process and the operation conditions.

Reasonable variation and modifications are possible within the scope of the disclosure, the drawings and the appended claims to the invention.

Having described our invention that which is claimed is:

1. A process for the introduction into a polymerization zone, having therein a polymerizable feed comprised of at least one conjugated diolefin containing four to 12 carbon atoms per molecule alone or in admixture with one or more compounds containing an active vinylidene group, $CH_2=C=$, and which are copolymerizable with said conjugated diene, of the amount of an organo-lithium polymerization initiator of the formula $R(Li)_x$ wherein R is a hydrocarbon radical selected from the group consisting of aliphatic, cycloaliphatic and aromatic radicals containing one to 20 carbon atoms and $x$ is an integer from 1 to 4 to obtain desired properties of the reaction product produced in said polymerization zone; said process comprising introducing into a second reaction zone a first sample of said polymerizable feed, treating said first sample with an amount of said organolithium polymerization initiator whereby a slight excess of said initiator remains in said sample, contacting the resulting mixture in said second reaction zone with at least the minimum sufficient quantity of a hydrocarbyl disulfide required to react with all of said initiator remaining in said first sample thus to form a mercaptide thereof, introducing said mercaptide into a titrating zone, introducing into and admixing silver nitrate with said mercaptide in said titrating zone until a sharp rise in electrical current is determined in said titrating zone thus indicating the titration end point, establishing a signal representative of the amount of said silver nitrate introduced into said titrating zone, and introducing said polymerization initiator into said polymerization zone in response to said signal.

2. A process according to claim 1 wherein said polymerizable feed is comprised of butadiene.

3. A process according to claim 1 wherein said polymerizable feed is comprised of butadiene and styrene.

4. The process of claim 1 wherein said initiator is n-butyllithium.

5. A process for the introduction into a reaction zone, having therein the reaction mixture comprising the reaction product formed by the polymerization of a polymerizable compound comprised of at least one conjugated diolefin containing four to 12 carbon atoms per molecule alone or in admixture with one or more compounds containing an active vinylidene group, $CH_2=C=$, and which are copolymerizable with said conjugated diene in the presence of an organolithium polymerization initiator of the formula $R(Li)_x$ wherein R is a hydrocarbon radical selected from the group consisting of aliphatic, cycloaliphatic and aromatic radicals containing one to 20 carbon atoms and $x$ is an integer from 1 to 4, of an amount of an agent selected from the group consisting of a coupling agent and a terminating agent required to obtain desired properties in said polymerization reaction product; which process comprises introducing into a second reaction zone a first sample of said reaction mixture comprised of said polymerization reaction product and polymerization initiator, contacting said sample with the minimum sufficient quantity of a hydrocarbyl disulfide required to react with all of said polymerization initiator therein thus to form a mercaptide thereof, introducing the resulting mercaptide-containing mixture into a titrating zone, introducing into and admixing silver nitrate with said mercaptide in said titrating zone until a sharp rise in electrical current is detected in said titrating zone thus indicating the titration end point, establishing a signal representative of the amount of said silver nitrate introduced into said titrating zone and introducing into said reaction zone said agent in response to said signal.

6. The process of claim 5 wherein said agent is a terminating agent.

7. The process of claim 5 wherein said agent is a coupling agent.

* * * * *